United States Patent [19]

Gotlieb et al.

[11] Patent Number: 4,925,576

[45] Date of Patent: May 15, 1990

[54] CONTINUOUS DISCHARGE CENTRIFUGE

[76] Inventors: Itzhak Gotlieb, 5 Balsam Ct., Roseland, N.J. 07068; Aharon Zidon, 27 Hamaalot Street, Givataim, Israel

[21] Appl. No.: 337,417

[22] Filed: Apr. 13, 1989

[51] Int. Cl.⁵ .............................................. B01D 33/06
[52] U.S. Cl. ..................................... 210/781; 210/327; 210/330; 210/370; 210/374; 210/386
[58] Field of Search ............... 210/781, 327, 329, 330, 210/360.1, 369, 370, 374, 377, 378, 380.1, 386

[56] References Cited

U.S. PATENT DOCUMENTS

| | | | |
|---|---|---|---|
| 831,332 | 9/1906 | Durfee | 210/370 |
| 928,750 | 7/1909 | Hampl | 210/378 |
| 1,002,677 | 9/1911 | Grill | 210/377 X |
| 1,367,046 | 2/1921 | Hiller | 210/370 |
| 1,441,751 | 1/1923 | Roberts | 210/378 |
| 1,846,168 | 2/1932 | Webb . | |
| 2,072,377 | 3/1937 | Morrison | 210/378 |
| 2,718,309 | 9/1955 | Saxe | 210/370 |
| 2,796,990 | 6/1957 | Peck | 210/377 X |
| 3,178,027 | 4/1965 | Von Rotel | 210/370 |
| 3,369,663 | 2/9168 | Serrell . | |
| 3,397,792 | 8/1968 | Serrell | 210/370 |
| 3,875,064 | 4/1975 | Camerine | 210/370 |
| 4,199,459 | 4/1980 | Filipowicz et al. | 210/370 X |
| 4,451,371 | 5/1984 | Peck | 210/374 X |
| 4,536,288 | 8/1985 | Hultsch | 210/370 X |

FOREIGN PATENT DOCUMENTS

| | | | |
|---|---|---|---|
| 1167795 | 4/1964 | Fed. Rep. of Germany | 210/374 |
| 12233 | of 1900 | United Kingdom | 210/374 |
| 281483 | 12/1927 | United Kingdom | 210/370 |

Primary Examiner—Robert Spitzer
Attorney, Agent, or Firm—Omri M. Behr, Esq.

[57] ABSTRACT

A continuous discharge centrifuge can separate a slurry into a solid and liquid portion. The centrifuge has a housing and a rotor mounted in the housing to spin at a predetermined rate. The centrifuge has a spaced plurality of filters peripherally mounted on the rotor for separating the liquid portion by admitting it under centrifugal force. Also included is a spaced plurality of passage columns mounted between adjacent pairs of the filters. The columns can engage the outside of filters and conduct the solid portion upon the filters between it and the passage columns.

13 Claims, 3 Drawing Sheets

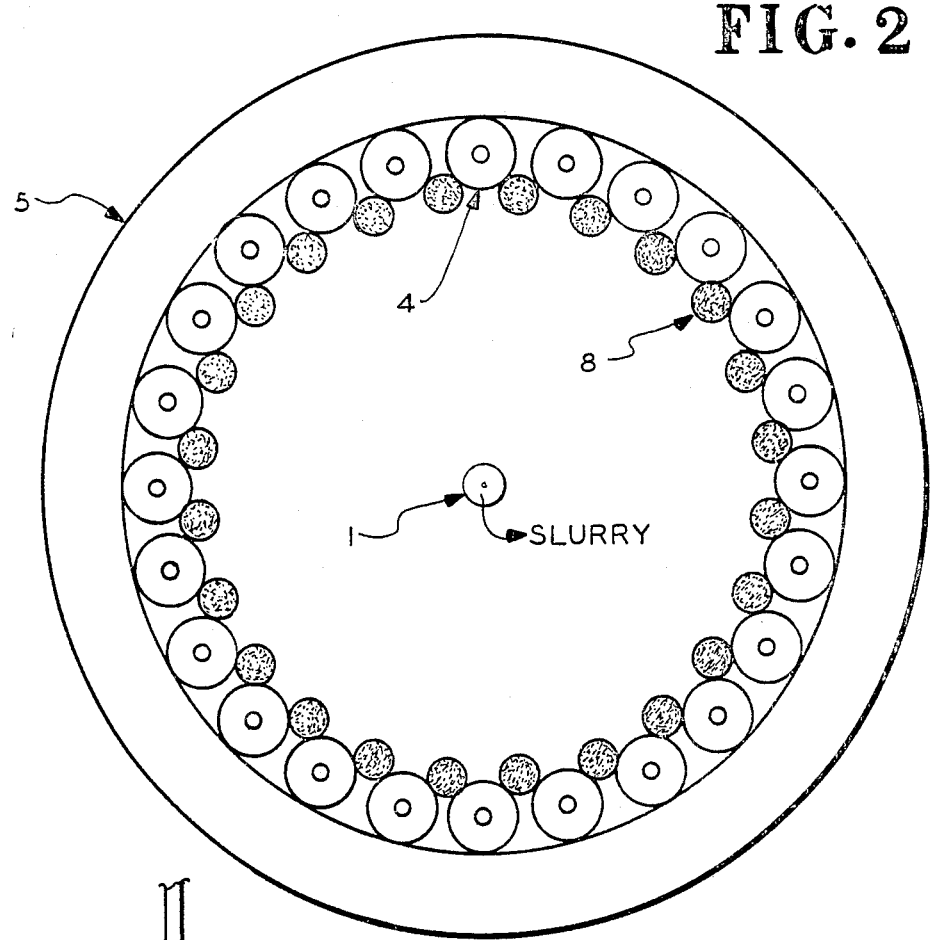
FIG. 2
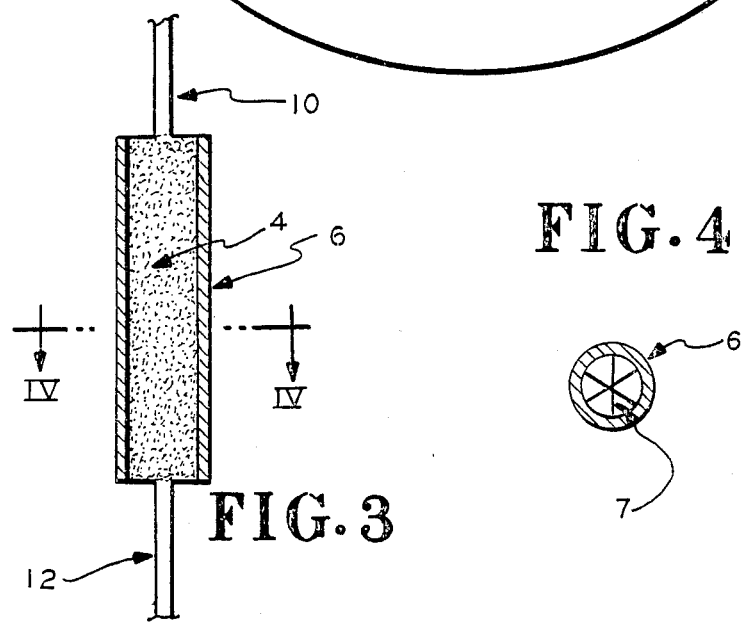
FIG. 3
FIG. 4

CONTINUOUS DISCHARGE CENTRIFUGE

BACKGROUND OF THE INVENTION

1. Field of the Invention

The present invention is concerned with a centrifugally driven filtration machine with continuous solids discharge, wherein the filtering surface is provided as a plurality of spaced filter elements within a centrifugal force field.

2. Discussion of the Relevant Art

The centrifugally driven filters are commonly used in the chemical, environmental and other industries for separating slurries into solid and liquid fractions. A typical centrifugal filter design is the so-called basket centrifuge, consisting of a perforated cylindrical bowl rotating about a vertical shaft. The inside surface of the bowl is lined with a replaceable filter cloth upon which the solids are retained, while the liquid is driven through the cloth by the centrifugal force. The operation is batchwise, i.e., the slurry feed must be periodically interrupted to allow for removal of the solids accumulated on the filter cloth by means of a scraping knife.

The performance of basket centrifuges has several drawbacks related to its batchwise operation, and to the limitations of the scraping knife action, which tends to compress a residual solids layer upon the filter cloth and thereby reduce its permeability.

A different approach to removing the solids from the filter cloth is to utilize the centrifugal force itself. For example, by reversing the filter cloth so the side originally facing the center of rotation during the filtration subsequently faces outwardly, i.e., in the direction away from the center.

For example, an apparatus has been proposed in U.S. Pat. No. 3,875,064 wherein a continuous filter cloth is mounted on a continuous moving belt traveling on a C-shaped assembly installed at the circumference of the centrifuge rotor.

SUMMARY OF THE INVENTION

In accordance with the illustrative embodiments demonstrating features and advantages of the present invention, there is provided a continuous discharge centrifuge. This centrifuge can separate a slurry into a solid and liquid portion. The centrifuge has a housing and a rotor mounted in the housing to spin at a predetermined rate. The centrifuge has a spaced plurality of filter means peripherally mounted on the rotor for separating the liquid portion by admitting it under centrifugal force. Also included is a spaced plurality of passage means mounted between adjacent pairs of the filter means. The passage means can engage the outside of filter means and conduct the solid portion upon the filters between it and the passage means.

A related method of the same invention employs a cylindrically disposed, contiguous plurality of alternating filters and columns for continuously separating a slurry into a solid and liquid portion. The method includes the step of revolving the filters and the columns at a predetermined rate. Another step is injecting the slurry radially outward onto the filters. The method also includes the step of engaging the outside of the filters with the columns to conduct the solid portion upon the filter between it and the passage columns.

Apparatus according to the principles of the foregoing invention can employ a filtering surface as a plurality of cylindrical elements installed within a centrifugal rotor assembly. Preferably the filters and passage columns can be turned about their own central axes. This allows solid fractions held on the filter to pass between the columns and filters, thereby reversing the effect of centrifugal force on the solids.

In a preferred embodiment the centrifugal rotor assembly includes primarily a main shaft, the cylindrical filter elements, and rotor plates or brackets for holding the filter elements in position with their axes parallel to the main shaft.

In operation, the rotor assembly is rotated about the main shaft at high speeds typical to centrifugal filters. Simultaneously, the filter elements are rotated about their respective axes at a slow speed (relative to the rotor speed) which may be adjusted to suit the particular application, i.e., to the properties of the slurry and the filtration performance requirements.

The feed slurry is introduced into the rotor assembly at the space between the main shaft and the filter elements. At any time during the operation, filtration takes place upon the side of the filter elements which faces the center of the rotor, and solids are discharged from the side of the filter elements which is facing away from the center, by the action of the centrifugal force.

The filter elements of the invention preferably have perforated surfaces upon which filter cloths of various porosity may be overlaid so as to provide for different filtration conditions. Continuous steady state operation is provided by maintaining a constant feed rate and a constant speed of rotation of the filter elements about their axes.

The spaces between adjacent filter elements are sealed against leakage of the slurry by sealing rollers which are pressed against the filter elements.

Continuous collection of the filtered solids is provided by enclosing the rotor assembly within a stationary casing which is designed to direct the flow of solids to an outlet conveyor. The filtered liquid collected within each of the filter elements, is drained into a common stationary trough equipped with a drain pipe leading out of the casing.

BRIEF DESCRIPTION OF THE DRAWINGS

The above brief description as well as other objects features and advantages of the present invention will be more fully appreciated by reference to the following detailed description of presently preferred but nonetheless illustrative and non-limiting embodiments in accordance with the present invention when taken in conjunction with accompanying drawings wherein:

FIG. 2 is a horizontal section of the centrifuge along line II—II of FIG. 1;

FIG. 3 is a longitudinal sectional view of a typical one of the filter elements of FIG. 1;

FIG. 4 is a cross-sectional view of the filter element of FIG. 3 taken along line IV—IV;

DESCRIPTION OF THE PREFERRED EMBODIMENT

Figure 1:
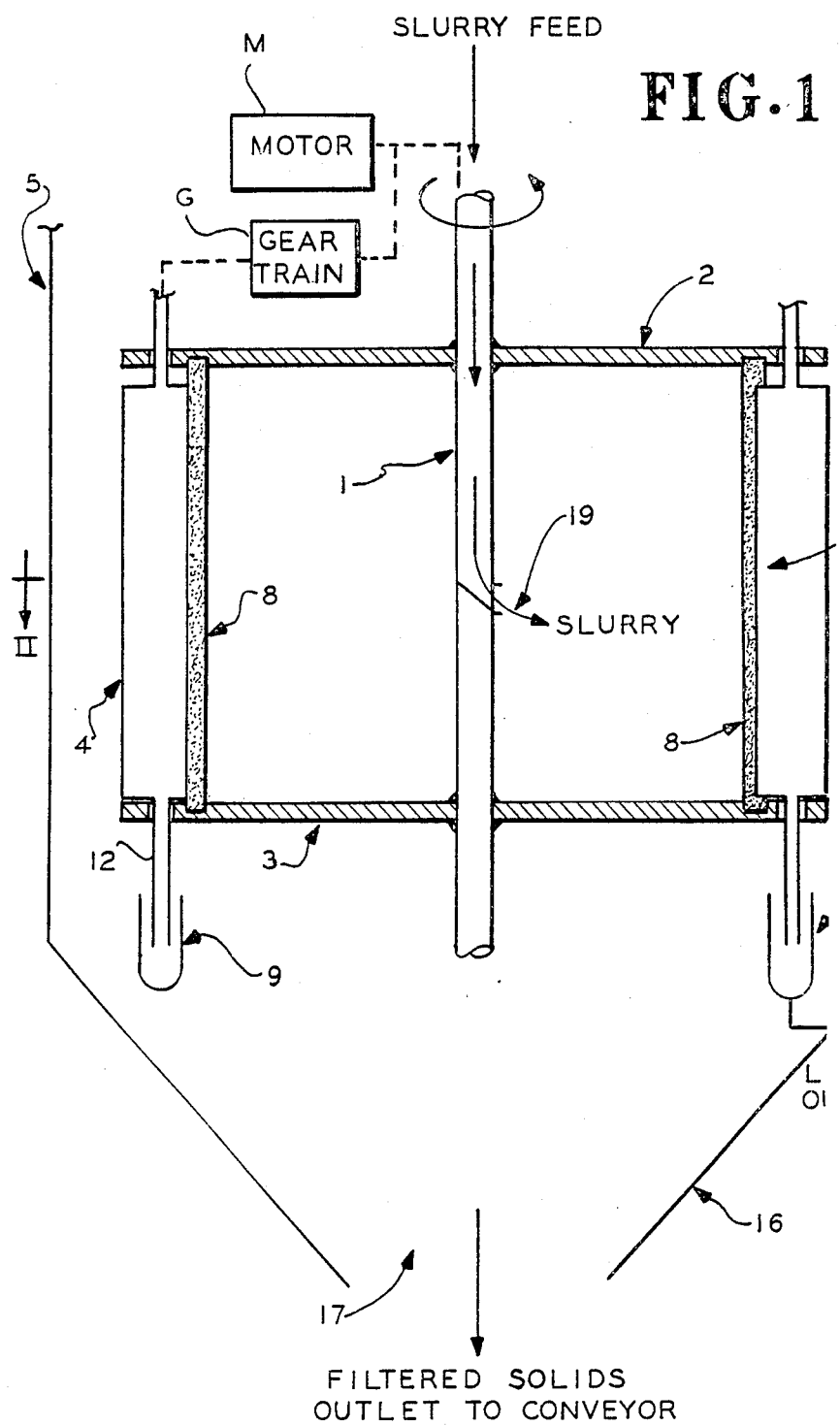
FIG. 1 is a vertical cross-sectional view taken along the main shaft of a centrifuge, according to the present invention.

FIGS. 1 and 2 illustrate the general arrangement of a preferred rotor assembly according to the present invention. The main components associated with this exemplary rotor assembly are main shaft 1, upper and lower rotor plates 2 and 3, respectively, filter elements 4, and sealing rollers 8. Shaft 1 is journalled in housing 5 for spinning at relatively high speeds. Housing 5 is shown having a cylindrical wall from which a frustroconical hopper depends.

Main shaft 1 is driven by a suitable motor driver M and gear (not shown) as required for providing the rotation of the rotor assembly. For example, shaft 1 can have a spur gear mounted around it at its upper end. Drive means M can operate either directly or through a gear train, although other methods of spinning shaft 1 will work as well. Shaft 1 is constructed as a pipe, or provided with an internal channel designed to conduct a feed slurry into the internal space of the rotor assembly, i.e., the space between the shaft 1 and the filter elements 4. An appropriate slurry feeder, or diffuser, may be provided (not shown) to facilitate even distribution of the slurry over the filtering surface. The diffuser may include a screen or baffles positioned to evenly distribute slurry.

The upper and lower rotor plates 2 and 3, respectively, are circular and rigidly fixed to shaft 1 in parallel planes which are perpendicular to shaft 1. Plates 2 and 3 may be constructed of solid metal plates, or as wheels with radial spokes connected to the shaft. The rims of the rotor plates may have evenly distributed notches 18 (FIG. 7) providing for assembly and disassembly of the filter elements 4 and their associated bearings.

Filter elements 4 are foraminous tubes covered with porous filtering sleeves. Filter elements 4 are arranged along the circumference of the rotor plates 2 and 3, and attached to the rotor plates by means of suitable bearings (not shown) which are mounted in the rotor plates to allow rotation of the filter elements 4 about their axes with minimal friction. The bearings for filter elements 4 are equipped with suitable gaskets or mechanical seals to prevent slurry particles or fluids from entering and damaging the bearings.

The rotor assembly may include additional components (not shown) such as steady bearings, slurry retaining barriers or weirs, and stiffening rods or rings as required for mechanical stability and integrity.

Filter elements 4 are evenly spaced along the circumference of the rotor plates, equidistant from the main shaft 1. As illustrated, filter elements 4 are driven through by drive means M through a gear train G which may include differential gearing or planetary gearing designed to slowly rotate filter elements 4 directly and passage columns 8 indirectly (although in some embodiments the indirect and direct drive may be reversed). Equal spacing is provided between adjacent filter elements 4, through which the filtered solids are discharged. These spaces are sealed against leakage of slurry by passage columns shown herein as sealing rollers 8, which fit in the spaces as shown in FIGS. 2 and 7.

Figure 5:
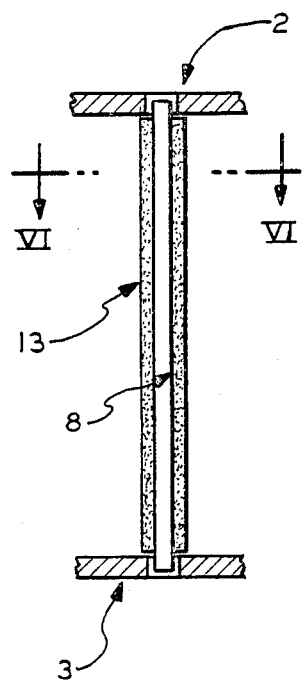
FIG. 5 is a longitudinal sectional view of a typical one of the sealing rollers of FIG. 1.
Figure 6:
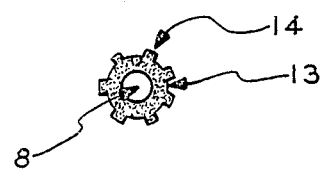
FIG. 6 is a cross-sectional view of the sealing roller of FIG. 5, taken along line VI—VI.
Figure 7:
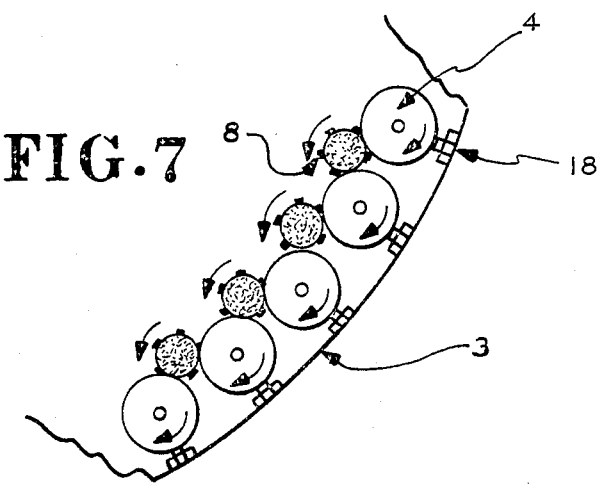
FIG. 7 shows a detail of the filter elements and sealing rollers of FIG. 2 showing their cooperation.

FIGS. 5, 6 and 7 illustrate the construction of the sealing rollers 8, and the manner by which they are assembled. Sealing roller 8 is constructed as a straight rod or pipe, whose ends are attached to the upper and lower rotor plates 2 and 3, respectively, by means of suitable bearings (not shown). The bearings of a sealing roller 8 are fixed in the rotor plates, are designed to allow rotation of the sealing rollers 8 about their axes with minimal friction and are equipped with suitable gaskets or mechanical seals to prevent penetration of liquids or solid particles which may damage the bearings. Each sealing roller 8 is provided with sleeve-like overlay 13, made of resilient, splined material such as rubber or latex, covering substantially the length between the rotor plates. When installed, each sealing roller 8 is pressed against its two adjacent filter elements 4.

The purpose of the sealing roller overlay 13 is to provide a flexible seal which prevents leakage of slurry while allowing the passage of the filtered solids which are deposited upon the filter surfaces. The flexible layer 13 on the sealing rollers 8 may be shaped with longitudinal ridges 14 to facilitate the conveying of the filtered solids through the spaces between adjacent filter elements.

The construction of the filter elements 4 is illustrated in FIGS. 3 and 4. The main part of the filter element is constructed as a perforated pipe or hollow cylinder whose length is substantially equal to the distance between rotor plates 2 and 3. A replaceable filter cloth 6, constructed as a tight-fitting sleeve, is fitted upon this section of the filter element. The provision of replaceable filter cloths of various materials and porosities is desirable for adjusting the filter operation to different types of slurries and performance requirements.

The bottom end of the straight cylinder is connected to an educator tube 12. The tube 12 serves both as a shaft of the filter element, and as a drain pipe for the filtered liquid.

The pipe 12 extends through the bearing provided in the lower rotor plate to a stationary trough 9 (FIG. 1) located below it. Trough 9 is an open container having an annular length.

The top end of the filter element 4 has an extension 10 which is similar to the tube 12 and likewise serves as a shaft of the filter element. The extension 10 extends through the bearing (not shown) provided in the upper rotor plate, then further to a gear or other common type of drive mechanism (not shown) which imparts rotary motion to the filter element.

A modification of the structure of the filter element 4 is to construct the entire length of the filter element, including parts 10 and 12, as a straight cylinder of substantially equal diameter. Accordingly, the extensions above and below the main (perforated) section of the cylinder are provided without perforations.

The interior of filter element 4 is divided into longitudinal sectors by partition vanes 7. The partitions 7 intersect at the axis of the filter element and extend through its entire length. The partition vanes 7 serve to collect the incoming filtered liquid and to direct its flow towards the drain outlet 12.

A stationary trough 9 is provided below the rotor assembly. The trough is constructed as an annular trough installed so that the drain pipes 12 from all the filter elements extend into the trough. A drain pipe 15 is provided to conduct the filtered liquid out of the trough and the centrifuge housing 5.

In operation, the slurry is fed continuously into the conduit within shaft 1. The slurry then flows, by gravity or under pressure, through an opening 19 provided in the shaft and distributed over the filter surfaces by means of a slurry diffuser (not shown). The slurry is deposited on the filter surface, i.e., the side of the filter elements 4 facing shaft 1, by the centrifugal force created by the rotation of the rotor assembly. The slurry is prevented from leaking through the spaces between filter elements 4 by the sealing rollers 8 which are pressed against the filter elements.

The centrifugal force drives the slurry liquid through the filter cloth 6 (FIG. 3), the perforated wall of the filter elements 4, and into the sectored spaces between the vanes 7 within the filter elements 4. The filtered liquid is then guided downwards by the partitions 7 to drain into the trough 9 (FIG. 1) via the eductor tubes 12.

Simultaneously, filter elements 4 are rotating at slow speed about their axes. The rotation of the filters is provided by gearing G or other type of drive mechanism which is commonly used in differential motion machines. In the preferred embodiment of the present invention, all filter elements 4 are rotated at the same speed and orientation. The speed of rotation may be adjusted to suit the filtration performance requirements.

As the filter element is rotated, the layer of filtered solids deposited upon the filter cloth is pressed between filter elements 4 and the adjacent sealing roller 8. Rollers 8 are free to rotate and are rotated by filter elements 4. The ridges 14 provided on the surface of sealing rollers 8 assist in pushing the filtered solids past the maximum compression point between filter element 4 and sealing rollers 8, and into the free space between the adjacent filter elements.

Upon further rotation, the filtered solids orientation changes towards the outside, i.e., away from the center, at which point they are dislodged from the filter by the centrifugal force.

Following their discharge from the filter surface, the movement of the filtered solids within the free space between the rotor assembly and the housing 5 is controlled by gravity and restrained by the centrifuge casing 5. In general, the solids are expected to drop down and exit the casing via frustro-conical hopper 16 having a bottom opening 17 which leads to a conveyor (not shown).

In cases where the solids tend to adhere to the casing wall, their downward motion may be assisted by a scraping knife or air stream (not shown). In some cases, it may be necessary to connect the bottom opening 17 by a flange to an air-tight conveyor in order to maintain the filter operation under elevated pressure.

Obviously many modifications and variations of the present invention are possible in light of the above teachings. It is therefore to be understood that within the scope of the appended claims, the invention may be practiced otherwise than as specifically described.

What is claimed is:

1. A centrifugal method employing a cylindrically disposed, contiguous plurality of alternating filters and columns for continuously separating a slurry into a solid and liquid portion, comprising the steps of:
    revolving said filters and said columns at a predetermined rate;
    injecting said slurry radially outward onto said filters;
    engaging the outside of said filters with said columns to conduct said solid portion upon said filter between it and said passage columns.

2. A centrifugal method according to claim 1 wherein the step of engaging the outside of said filters comprises the step of:
    turning said filters and said passage columns at a non-zero rate less than said predetermined rate and measured with a frame of reference spinning at said predetermined rate.

3. A continuous discharge centrifuge for separating a slurry into a solid and liquid portion, comprising:
    a housing;
    a rotor mounted in said housing to spin at a predetermined rate;
    a spaced plurality of filter means peripherally mounted on said rotor for separating said liquid portion by admitting it under centrifugal force; and
    a spaced plurality of passage means rotatably mounted on said rotor between adjacent pairs of said filter means for engaging the outside of said filter means and conducting said solid portion upon said filter means between it and said passage means.

4. A continuous discharge centrifuge according to claim 3 wherein each of said filter means is rotatably mounted on said rotor.

5. A continuous discharge centrifuge according to claim 3 wherein each of said filter means is rotatably mounted on said rotor, said centrifuge further comprising:
    drive means for turning said filter means and said passage means at a non-zero rate less than said predetermined rate and measured with said rotor as a frame of reference.

6. A continuous discharge centrifuge according to claim 5 wherein said filter means are spaced equiangularly and are radially equidistant, and wherein said passage means are spaced equiangularly and are radially equidistant, said each of said filter means touching at least one of said passage means.

7. A continuous discharge centrifuge according to claim 6 wherein each of said filter means comprises:
    a permeable surface facing inwardly; and
    a non-permeable surface outwardly spaced from and facing said permeable surface.

8. A continuous discharge centrifuge according to claim 7 wherein said permeable surface is tubular and wherein said non-permeable surface comprises:
    a plurality of radial vanes mounted within said tubular surface.

9. A continuous discharge centrifuge according to claim 8 wherein each of said filter means comprises:
    an eductor tube communicating with said permeable surface for conducting said liquid portion downward; and
    an annular trough sized and positioned to receive the discharge of said eductor tube.

10. A continuous discharge centrifuge according to claim 5 wherein said passage means comprises:
    a resilient splined column.

11. A continuous discharge centrifuge according to claim 5 wherein said drive means drives said filter means directly and said passage means indirectly.

12. A continuous discharge centrifuge according to claim 5 wherein said rotor comprises:
    an upper and lower plate: and
    a hollow shaft having a central outlet for conducting said slurry into said housing.

13. A continuous discharge centrifuge according to claim 3 wherein said filter means are spaced radially outward from said passage means.

* * * * *